US005636512A

United States Patent [19]
Culver

[11] Patent Number: 5,636,512
[45] Date of Patent: Jun. 10, 1997

[54] NUCLEAR ROCKET FEED SYSTEM INCORPORATING AN AUXILIARY POWER CYCLE

[75] Inventor: Donald W. Culver, Sacramento, Calif.

[73] Assignee: Aerojet General Corporation, Rancho Cordova, Calif.

[21] Appl. No.: 324,058

[22] Filed: Oct. 14, 1994

[51] Int. Cl.$^6$ ................................................. G21D 5/00
[52] U.S. Cl. ................... 60/203.1; 60/39.511; 60/267; 376/318
[58] Field of Search ................. 60/200.1, 203.1, 60/260, 266, 267, 39.511, 39.52, 39.465; 376/318, 319, 909

[56] References Cited

U.S. PATENT DOCUMENTS

| | | | |
|---|---|---|---|
| 2,956,402 | 10/1960 | Rae | 60/39.511 |
| 3,049,870 | 8/1962 | Chanberlain | 60/260 |
| 3,110,154 | 11/1963 | Edelbaum et al. | 376/318 |
| 3,113,089 | 12/1963 | Nagey et al. | |
| 3,116,212 | 12/1963 | Lindberg, Jr. | |
| 3,158,002 | 11/1964 | Spillmann | 376/318 |
| 3,168,807 | 2/1965 | Ledwith et al. | 60/203.1 |
| 3,274,770 | 9/1966 | Carter et al. | 376/318 |
| 3,315,471 | 4/1967 | Dailey et al. | |
| 3,383,858 | 5/1968 | Willinski et al. | |
| 3,516,254 | 6/1970 | Hammond | 60/260 |
| 3,778,344 | 12/1973 | Walsh | 376/318 |
| 4,171,615 | 10/1979 | Stewart et al. | 60/203.1 |
| 4,238,925 | 12/1980 | Lowther | 60/39.511 |
| 5,129,599 | 7/1992 | Wollen | 60/39.465 |
| 5,410,874 | 5/1995 | Limerick | 60/267 |

FOREIGN PATENT DOCUMENTS 409498  5/1934  United Kingdom ............... 60/267

OTHER PUBLICATIONS

Newgard and Levoy, Nuclear Science and Engineering, vol. 7, No. 4, pp. 378–380 Apr. 1960.
Turner and Clement, "A Model of the Dynamic Behavior of the Coaxial–Flow Gaseous–Core Nuclear Reactor", Nuclear Technology, vol. 20, pp. 5–14 Oct. 1973.
Conference: Proceedings of the the 13th Intersociety Energy Conversion Engineering Conference, San Diego, CA, USA (Aug. 20–25, 1978) pp. 1678–1684.
"Reactors in Flight" *Engineering*, Feb. 28, 1958, pp. 268–270.
"Nuclear Rockets" by Jerry Grey, *Nucleonics*, vol. 16, No. 7–Jul., 1958. pp. 62–65.
"Rocket–Reactor Design" by Levoy et al., *Nucleonics*, vol. 16, No. 7–Jul., 1958. pp. 66–68.
"Nuclear–Rocket Timetable" *Nucleonics*, vol. 16, No. 7–Jul., 1958. p. 69.
"Los Alamos' Project Rover" by Raemer E. Schreiber, *Nucleonics*, vol. 16, No. 7–Jul., 1958. pp. 70–72.
"Beyond Tomorrow", *Nucleonics*, vol. 16, No. 7–Jul., 1958. pp. 73–75.

*Primary Examiner*—Timothy Thorpe
*Assistant Examiner*—Ted Kim
*Attorney, Agent, or Firm*—Townsend and Townsend and Crew LLP

[57] ABSTRACT

A nuclear rocket engine comprising a primary feed system (4) for pumping rocket propellant from a propellant source (10) to a nuclear reactor (6) and an auxiliary feed system (60) coupled to the primary feed system. The auxiliary feed system includes a space radiator (84) for discharging excess reactor heat into space and a motorgenerator (74) for creating electricity from the excess reactor heat. A recuperator (20) operates to heat liquid propellant before it enters the reactor and to retain heat within the system. The auxiliary power system can be configured into a high thrust mode (see FIG. 1) for withdrawing heat from the engine when the reactor is operating at full power, a low thrust mode (see FIG. 2) for throttling propellant flow and radiating heat from the engine during reactor shutdown and a zero thrust mode (see FIG. 3) for cooling the nuclear reactor and generating electricity for the rocket's auxiliary power requirements for the remainder of the mission.

10 Claims, 3 Drawing Sheets

NUCLEAR ROCKET FEED SYSTEM INCORPORATING AN AUXILIARY POWER CYCLE

FIELD OF THE INVENTION

This invention relates to nuclear rocket engines generally and more specifically to a nuclear rocket feed system that incorporates an auxiliary power cycle.

BACKGROUND OF THE INVENTION

Conventional nuclear rocket engines employ a nuclear fission reactor to heat the rocket propellant, typically hydrogen, to extremely large temperatures. The hot hydrogen is then expelled from a nozzle into space at supersonic speed to create thrust for the rocket. To conserve nuclear fuel and propellant, space mission operations will typically only require short duration engine firings. The reactor is turned on for a brief period to generate thrust to propel the rocket to a cruise velocity in space and then the reactor is shut down.

Shutting down nuclear rocket engines during the space mission has presented many design challenges. One challenge results from the fact that nuclear reactors cannot be immediately turned off. Delay neutrons and daughter products of the fission reaction generate power long after the reactor ceases to operate. This energy or heat must be removed from the rocket to prevent overheating and destruction of the engine. In addition, the engine feed system (pumps and turbines) must be shut down as the reactor power decays to throttle propellant flow and to prevent the pumps from surging. Shutting down the feed system, however, makes it makes it extremely difficult to remove the reactor heat from the engine.

Another challenge created by shutting down rocket engines in flight is cooling the nuclear reactor. Byproducts of the nuclear reaction (waste heat) continuously heat the components of the reactor during engine firing and long after the engine has been shut down. To solve this problem, liquid or gaseous hydrogen (apart from the actual propellant) is typically used to cool the reactor. The hydrogen is directed through the reactor, which transfers some of its heat to the hydrogen, and is then expelled from the rocket into space. This process continues until the reactor temperature has been brought down to a safe level. One problem with this method is that cooling the reactor can take a long time (from a few hours to a few days). Thus, an enormous amount of hydrogen must be stored in the rocket to cool the reactor. This large volume of hydrogen increases the weight of the rocket which decreases mission performance (payload/ initial mass) and increases mission cost.

To decrease the amount of hydrogen needed to cool the reactor, existing systems have attempted to alternate between undercooling and overcooling the reactor. In this scheme, the reactor is allowed to heat up until it reaches a very high temperature and is then quickly cooled down with extremely cold propellant. Hydrogen is conserved because it is not continuously pumped through the reactor and into space. Alternating between undercooling and overcooling the reactor, however, can create thermal shocks that damage reactor components and create flow instabilities, thereby decreasing the life of the nuclear engine.

SUMMARY OF THE INVENTION

The present invention solves these problems of shutting down the engine during flight and cooling the reactor throughout the space mission. To accomplish this, a nuclear rocket engine includes a primary feed system for pumping rocket propellant from a propellant source to a nuclear reactor and an auxiliary feed system coupled to the primary feed system. The auxiliary feed system can be configured into a high thrust mode for withdrawing heat from the engine when the reactor is operating at full power, a low thrust mode for throttling propellant flow and radiating heat into space during reactor shutdown and a zero thrust mode for cooling the nuclear reactor and generating electricity for the rocket's auxiliary power requirements during the remainder of the mission.

In the high thrust mode, the auxiliary feed system includes a bypass line with an inlet coupled to a recycling port in the primary feed system, an outlet coupled to the propellant source and means for withdrawing heat from propellant flowing along the bypass line. A recuperator is coupled to the primary feed system for transferring heat from the hot propellant in the reactor to the cool propellant from the propellant source. A portion of this now heated propellant is bled into the auxiliary feed system after passing through the recuperator to withdraw heat from the engine. This heat can be converted into electricity to power other operations on the rocket or discharged into space to release heat from the engine or control the attitude of the rocket.

Preferably, the auxiliary feed system is a Brayton power cycle having a turbine coupled to a compressor for pumping propellant through the feed system. The heat withdrawing means comprises a space radiator for withdrawing heat from the warm propellant that has passed through the recuperator and discharging this heat into space. The heat withdrawing means may also include a motorgenerator coupled to the turbine for translating the mechanical energy of the turbine into electricity. The cooled gaseous hydrogen is then recycled back into the propellant source to maintain a suitable pressure within the propellant source.

In the low thrust mode, the auxiliary feed system has an inlet coupled to a recycling port in the nuclear reactor between the fuel assemblies and the nozzle and an outlet coupled to the reactor between the reactor inlet and the fuel assemblies. In this mode, a portion of the hot propellant exiting the fuel assemblies is bled into the auxiliary feed system to discharge heat (generated by the neutron delay reactions in the fuel assemblies) into space. Some of this heat is used to drive the turbine so that the auxiliary feed system can pump the propellant through the primary feed system. In this manner, the main pumps and turbines in the primary feed system can be shut down to facilitate throttling of the propellant flow and to prevent the pumps from surging during reactor shutdown. Similar to the high thrust mode, electricity is generated from the waste heat with the motorgenerator and the cooled propellant maintains a suitable pressure in the propellant source.

In the zero thrust mode, the auxiliary feed system has an inlet coupled to the reactor between the fuel assemblies and the nozzle and an outlet coupled to the primary feed system. In this mode, the nozzle is bypassed so that all of the hot propellant from the fuel assemblies flows into the auxiliary power system to discharge heat through the space radiator. The cooled hydrogen is then recycled back through the reactor to continue the cooling process. Thus, the reactor can be completely cooled without losing any hydrogen. This results in a substantial decrease in the amount of hydrogen needed for a space mission and, therefore, a substantial decrease in the weight of the rocket.

Another advantage of the present invention is that reactor coolant gas is preheated before cooling the fuel assemblies in the low and zero thrust modes. Preheating the reactor coolant gas increases flow stability and proper cooling of the fuel assemblies even at low flow velocities. This increases the life of the system because thermal shocks and flow instabilities are avoided.

The above is a brief description of some deficiencies in the prior art and advantages of the present invention. Other features, advantages and embodiments of the invention will be apparent to those skilled in the art from the following description, accompanying drawings and appended claims.

DESCRIPTION OF THE PREFERRED EMBODIMENT

Figure 1:
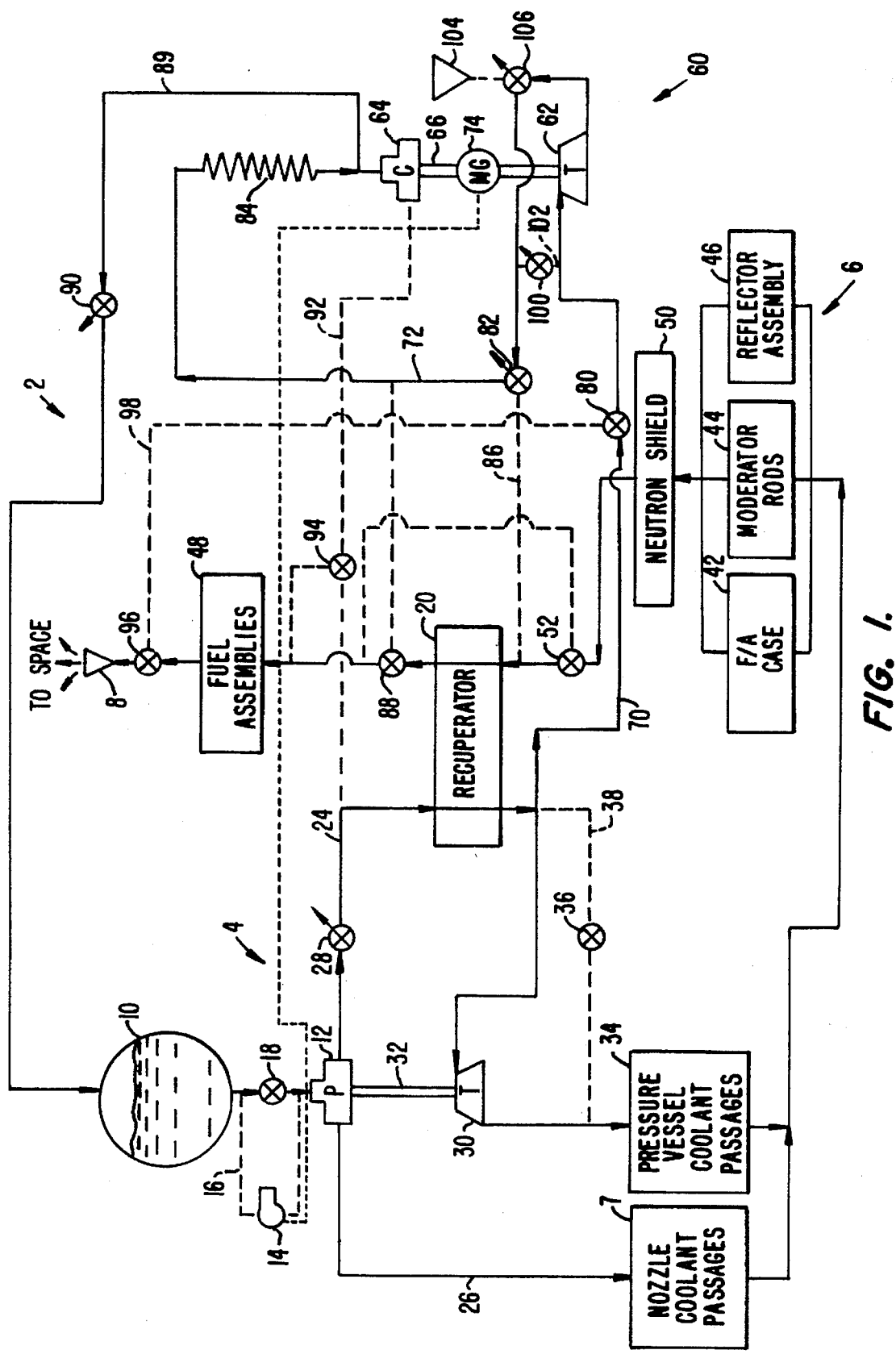
FIG. 1 is a schematic view of a nuclear rocket engine operating in a high thrust mode according to the principles of the present invention.

Referring to the drawings in detail, wherein like numerals indicate like elements, a nuclear rocket engine 2 is illustrated according to the principles of the present invention. Nuclear rocket engine 2 generally includes a primary feed system 4 connected to a nuclear reactor 6 for heating rocket propellant and a nozzle 8 for accelerating the rocket propellant to provide thrust for the rocket.

Referring to FIG. 1, primary feed system 4 is a "topping power cycle" in which excess reactor 6 heat is used to run feed system 4. The rocket propellant, liquid hydrogen, is stored in a main tank 10 located within the rocket upstream of feed system 4. A turbopump 12 coupled to main tank 10 functions to draw the hydrogen from main tank 10, pressurize it and then pump the high pressure hydrogen through feed system 4. To help start pump 12, an electric pump 14 is positioned along an alternative flow path 16 between main tank 10 and pump 12. A pump inlet valve 18 is coupled to main tank 10 to allow the liquid hydrogen to enter electric pump 14 and control the flow of hydrogen into the system. Electric pump 14 initially draws hydrogen from main tank 10 to start the flow of hydrogen through pump 12. Once pump 12 begins running, electric pump 14 is turned off and valve 18 is opened. In addition, electric pump 14 functions to pump hydrogen through feed system 4 when the system is operating in the low and zero thrust modes and pump 12 is shut down (discussed in greater detail below).

Pump 12 is coupled to a recuperator 20 by a primary feed line 24 and to nozzle coolant passages 7 by a secondary feed line 26. A control valve 28 is positioned along primary feed line 24 to control the amount of hydrogen that flows though primary and secondary feed lines 24, 26. Preferably, a small portion of the hydrogen flows through secondary feed line 26 into nozzle coolant passages 7 to cool nozzle 8. Most of the hydrogen will be directed through primary feed line 24 into recuperator 20. Recuperator 20 serves to transfer heat to the liquid hydrogen from heated, gaseous hydrogen within nuclear reactor 6. Recuperator 20 is preferably a large, high surface area heat exchanger that performs a variety of functions discussed below.

A turbine 30 is coupled to pump 12 by a rotating shaft 32 and primary feed line 24. Turbine 20 rotates shaft 26 and drives pump 12 when the heated hydrogen from recuperator 20 enters turbine 30. The hydrogen then flows through reactor pressure vessel coolant passages 34 to cool the pressure vessel. A bypass valve 36 is positioned along a turbine bypass line 38 to allow the hydrogen to flow around turbine 30. Bypass line 38 provides an additional flow passage for the hydrogen when turbine 30 is shut down in the low and zero thrust modes. In addition, valve 36 controls the power output by turbine 30.

It should be noted that the invention is not limited to the configuration discussed above. For example, a plurality of turbopumps and turbines can be coupled in parallel to run feed system 4. In addition, other conventional power systems may be utilized to pump rocket propellant through reactor 6.

As shown in FIG. 1, the hydrogen flowing along primary and secondary feed lines 24, 26 combine after passing through and receiving excess reactor heat from nozzle coolant passages 7 and pressure vessel 34. The hydrogen then flows into nuclear reactor 6 to cool the various components of the reactor 6 (fuel assembly casings 42, moderator rods 44 and a reflector assembly 46). Fuel assembly casings 42 house fuel assemblies 48, which produce a nuclear fission reaction to heat the hydrogen to extremely high temperatures, typically in excess of 4000° F. Reflector assembly 46 controls the fission reaction by reflecting and absorbing neutrons. Preferably, a neutron shield 50 is disposed between fuel assemblies 48 and the rest of the rocket forward of the fuel assemblies 48 to slow and deflect the neutrons away from the rocket and into space. The hydrogen flows through passages in neutron shield 50 to cool neutron shield 50.

Reflector assembly 46, moderator rods 44 and fuel assembly casings 42 transfer excess reactor heat (created as a byproduct of fuel fissions) to the hydrogen. Although the hydrogen has been heated in recuperator 20, it has cooled somewhat in turbine 30, and its temperature remains low enough to receive the excess reactor heat and thereby cool the components of reactor 6. In the low and zero thrust modes (FIGS. 2 and 3), pre-heating the liquid hydrogen facilitates the cooling of reactor 6 because it increases the Reynolds number of the hydrogen flowing through the reactor components. A low Reynolds number would cause the hydrogen to flow through locally cool areas in reactor 6 and bypass hotter areas. These hotter areas would receive very little coolant possibly causing reactor 6 to melt.

The heated hydrogen flows from reactor 6 into recuperator 20 where it cools to a low temperature and transfers most of its heat to the liquid hydrogen coming from pump 12. A recuperator bypass valve 52 is connected between the outlet of reactor 6 and recuperator 20. Closing recuperator bypass valve 52 causes the hydrogen exiting reactor 6 to bypass recuperator 20 and enter directly into fuel assemblies 48. Opening recuperator bypass valve 52 allows the hydrogen to flow through recuperator 20 as described above. Recuperator bypass valve 52 will generally be closed when nuclear engine 2 is throttling down in the low and zero thrust modes so that the heated hydrogen can run the auxiliary feed system described below.

After losing most of its heat in recuperator 20, the hydrogen then enters fuel assemblies 48, where it is heated to the full outlet temperature and propelled through nozzle 8. Nozzle 8 is preferably a convergent-divergent expansion nozzle that accelerates the hydrogen to mach 1.0 at the throat. The hydrogen is then expanded and accelerated beyond mach 1.0 into space to provide thrust for the rocket. It should be noted that the components of reactor 6 are shown schematically in FIG. 1 to illustrate the hydrogen flow path. As will be apparent to one of ordinary skill in the art, the invention can be utilized with a variety of conventional nuclear reactors and nozzles.

An auxiliary feed system 60 is coupled to a recycling port along primary feed line 24 between pump 12 and turbine 30, as shown to the right side of FIG. 1. Preferably, auxiliary feed system 60 is a Brayton power cycle. However, variations of this cycle and a variety of other conventional power cycles with appropriate heat exchangers could be used in conjunction with the present invention. Auxiliary feed system 60 includes a turbine 62 and a compressor 64 coupled by a rotating shaft 66. Turbine 62 has an inlet connected to primary feed line 24 by a bleed line 70 and an outlet connected to the inlet of a space radiator 84 by a recuperator bypass line 72. Radiator 84 withdraws heat from the hydrogen passing through and then radiates this heat into space. Radiator 84 has a longer flow path than indicated in FIG. 1 and is positioned throughout the rocket. Preferably, radiator 84 is constructed to radiate a megawatt or more of heat at about 1000° F. A motor generator 74 integrated along rotating shaft 66 receives mechanical energy from turbine 62 and converts this energy into electricity. Alternatively, motor generator 74 can receive electricity from a storage source (not shown) and cause shaft 66 to rotate to start auxiliary feed system 60.

A bleed valve 80 is positioned along bleed line 70 to draw some of the heated hydrogen leaving recuperator 20 into the inlet of turbine 62. The hydrogen provides turbine 62 with power to rotate shaft 66 and drive motor generator 74. A variable control valve 82 is disposed between space radiator 84 and the outlet of turbine 62. Variable control valve 82 functions to vary the amount of hydrogen that flows along a recuperator line 86 into recuperator 20 (see FIG. 2 and 3) and the amount of hydrogen that flows along recuperator bypass line 72 directly into radiator 84. The hydrogen that flows through recuperator 20 will transfer some of the reactor waste heat to the liquid hydrogen from main tank 10, thereby retaining the heat in the system. A flow diverter valve 88 is positioned between recuperator 20 and fuel assemblies 48 to direct this hydrogen towards radiator 84 (see FIG. 2). The hydrogen that bypasses recuperator 20 and flows directly into radiator 84 will discharge the waste heat into space to decrease the overall heat within the system. As discussed below, this allows the operator to vary the amount of heat that is retained in rocket engine 2 in the zero thrust mode (FIG. 3).

The gaseous hydrogen exiting radiator 84 is directed through a gas line 89 into main tank 10 when a three-position valve 94 is closed. Pumping hydrogen gas back into main tank 10 serves to maintain a positive pressure within main tank 10 so that hydrogen will flow into primary feed system 4. A pressure regulator 90 meters the rate of flow along gas line 89 and the pressure in tank 10. In the low and zero thrust modes, some of the hydrogen exiting radiator 84 will flow through compressor 64. Compressor 64 pressurizes the hydrogen and pumps hydrogen gas along a closed-loop line 92 back to primary feed line 24 or into reactor 6 upstream of fuel assemblies 48. Three-position valve 94 is disposed along closed loop line 92 between compressor 64 and primary feed line 24. Three-position valve 94 controls flow so that the hydrogen is either directed into fuel assemblies 48 to be ejected from rocket engine 2 or pumped back into primary feed line 24 along closed loop line 92. Valve 94 may also be closed to direct all of the hydrogen along line 89, as discussed above (e.g. high thrust mode).

A closed-loop bypass valve 96 is connected between fuel assemblies 48 and nozzle 8. Opening closed-loop valve 96 allows the fully heated hydrogen to exit nozzle 8 and provide thrust for the rocket. Closing closed-loop valve 96 causes the hydrogen to flow into auxiliary feed system 60 through a recycling port between the fuel assemblies 48 and nozzle 8 through bypass line 98 (see FIG. 3). Preferably, valve 96 will not be closed when reactor 6 is at or near full power. At this power level, the hydrogen exiting fuel assemblies 84 is at maximum temperature and could damage the components of auxiliary feed system 60, such as turbine 62.

A turbine bypass valve 100 is positioned on a turbine bypass line 102 upstream of turbine 62 and a vent 104 is positioned downstream of turbine 62. Vent 104 is connected to auxiliary feed system 60 by a release valve 106. Closing turbine bypass valve 100 allows turbine 62 to generate full power. Opening release valve 106 causes some of the hydrogen to bleed into space, thereby lowering the pressure at the turbine outlet. This creates a suction at the turbine outlet and facilitates starting turbine 62 when the Brayton Cycle commences operation.

Vent 104 may also consist of a number of smaller attitude control nozzles (ACS, not shown) disposed at the rear end of the rocket. Each ACS nozzle is connected to auxiliary power system 60 by a release valve. The release valves can each be individually opened to vent some of the heated hydrogen gas circulating through auxiliary feed system 60 out of the ACS nozzles and into space. Venting warm hydrogen gas out of the ACS nozzles allows the operator to control the attitude of the rocket without a separate chemical propulsion system.

In use, auxiliary feed system 60 can be operated in three different modes, a high thrust mode (FIG. 1), a low thrust mode (FIG. 2) and a zero thrust mode (FIG. 3). In the high thrust mode, nuclear reactor 6 is operating at or near full power (thrust) and auxiliary feed system 60 mainly operates to convert reactor waste heat into electricity. In this mode, pump inlet valve 18 is open and turbine bypass valve 36 is generally closed so that hydrogen from main tank 10 flows through pump 12, which pumps most of the hydrogen through recuperator 20 and turbine 30. The hydrogen drives turbine 30, cools pressure vessel 34, then combines with hydrogen from nozzle coolant passages 7 and cools the reactor components (moderator rods 44, fuel assembly casings 42 and reflector assembly 46). After cooling reactor 6, the heated hydrogen passes through recuperator 20 to transfer heat to the liquid hydrogen from pump 12 and then flows through fuel assemblies 48 and nozzle 8 as described above.

Bleed valve 80 is configured so that a small portion of the heated hydrogen from pump 12 flows along bleed line 70 into turbine 62 of auxiliary feed system 60. Turbine 62 then spins rotatable shaft 66 to generate electricity with motor-generator 74 for all of the rocket's electrical needs. Hydrogen is also available for attitude control thrust through vent 104, as described above. The hydrogen then flows along recuperator bypass line 72 into radiator 84, where it radiates heat into space. The hydrogen gas is then metered through pressure regulator 90 to main tank 10 to maintain the pressure level in tank 10.

The high thrust mode is the main operating mode of auxiliary feed system 60 when reactor 6 is operating at full power. Once the rocket has reached cruise velocity, thrust is terminated to conserve propellant and nuclear fuel. Because of delay neutrons and daughter products inherent with nuclear fission reactions, it takes a long time for the reactor to completely shut down. Generally, reactor power decays exponentially so that reactor 6 will drop from about 1000 megawatts (full power) to about 300 megawatts in the first second and to about 100 megawatts in the next 30–60 seconds. Nuclear engine 2 will preferably remain in the high thrust mode during this initial 30–60 seconds to maintain a high flow rate and to release the energy generated from the remaining reactor power out of rocket engine 2.

Figure 2:
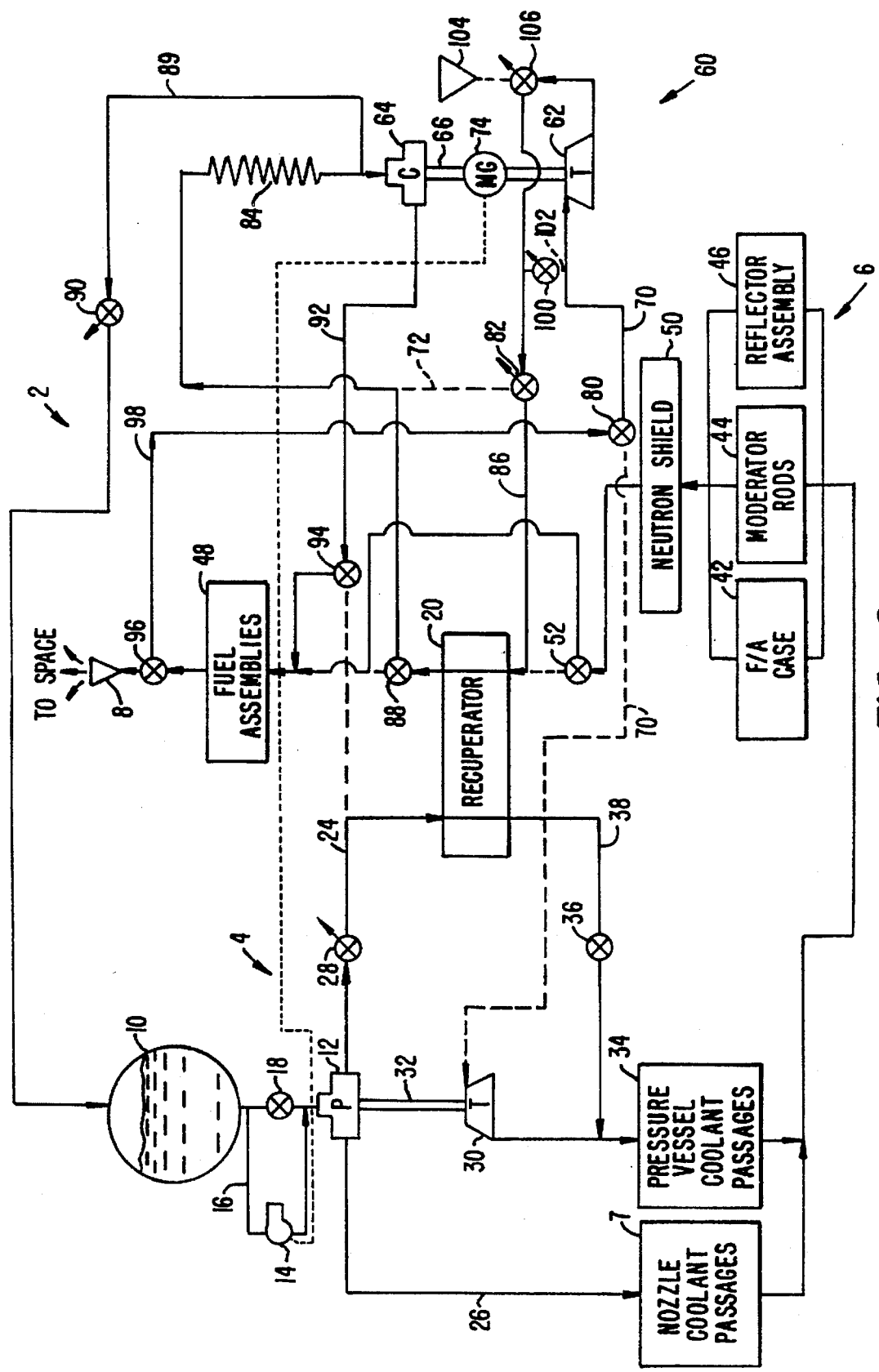
FIG. 2 is a schematic view of the nuclear rocket engine of FIG. 1 operating in a low thrust mode.
Figure 3:
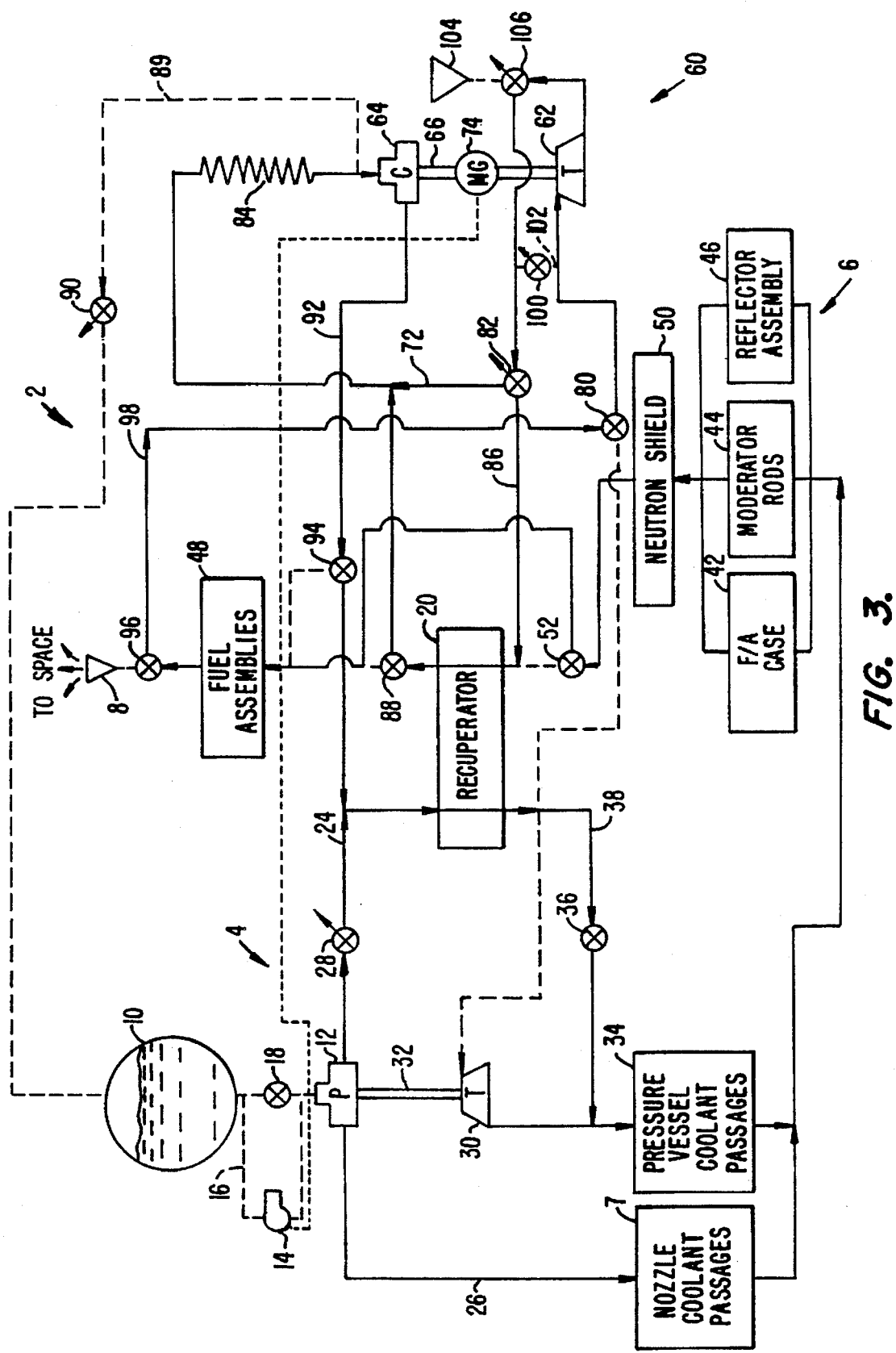
FIG. 3 is a schematic view of the nuclear rocket engine of FIG. 1 operating in a zero thrust mode.

Once the power level reaches about 50–100 megawatts or about 5–10% of full power, nuclear engine 2 will preferably be shifted into the low thrust mode, as shown in FIG. 2. The low thrust mode is used to slowly throttle hydrogen flow through feed system 4 as reactor 6 approaches the 1% power level. Nuclear engine will preferably remain in the low thrust mode for about 30–60 minutes, but this may vary depending on the half-life of the fission reaction products. In this mode, pump 12 and turbine 30 of primary feed system 4 are shut down so that pump 12 does not surge from the greatly decreased flow rate. However, liquid hydrogen must still be pumped from main tank 10 through nozzle 8 because the power level is too high to discharge all of the energy through space radiator 84.

To continue pumping hydrogen into primary feed system 4, bypass valve 18 is closed and electric pump 14 is started with excess electricity created by motorgenerator 74. Electric pump 14 pumps liquid hydrogen through recuperator 20 and bypass valve 36 is opened so that the hydrogen can bypass the non-functioning turbine 30. Bleed valve 80 is configured so that bleed line 70 is closed off and all of the hydrogen flows through the reactor components. Recuperator bypass valve 52 is closed so that the hydrogen exiting reactor 6 bypasses recuperator 20 and enters fuel assemblies 48. The hydrogen is heated to about 30–50% of the full outlet temperature (depending on the power level of reactor 6) and discharged through nozzle 8 to provide low thrust for the rocket.

A portion of the hydrogen exiting fuel assemblies 48 (preferably about 50%) is bled along closed-loop line 98 into turbine 62. The hydrogen entering turbine 62 is much hotter in the low thrust mode than in the high thrust mode because it is coming directly from the outlet of fuel assemblies 48. Turbine 62 can therefore spin motorgenerator 74 to create electricity to run pump 14 and drive compressor 64 to pump the hydrogen through the system. Variable control valve 82 directs all of the hydrogen through recuperator 20 to transfer heat to the liquid hydrogen from pump 12. The hydrogen then enters radiator 84 and releases the majority of its remaining heat into space.

A portion of the cooled gaseous hydrogen is directed along tank line 89 into main tank 10 to maintain a positive pressure in tank 10. The rest of the hydrogen enters compressor 64, where it is compressed and directed back into fuel assemblies 48 by three-position valve 94. The cold hydrogen entering fuel assemblies 48 mixes with the hot hydrogen from reactor 6 to reduce the overall outlet temperature of fuel assemblies 48. This reduces the power/flow ratio to throttle the flow through nuclear engine 2. In addition, the low outlet temperature prevents internal parts within the fuel assemblies from breaking because these parts generally cannot withstand high temperatures when propellant flow through reactor 6 is low.

Once reactor 6 has been brought down to about 1% of full power, nuclear engine 2 can be shifted into the zero thrust mode. Nuclear engine 2 can remain in this mode for the remainder of the mission unless thrust is needed (e.g. to overcome atmospheric friction or gravitational pulls in space). As shown in FIG. 3, the zero thrust mode is a closed loop in which hydrogen is conserved in the system rather than discharged through nozzle 8.

In this mode, pressure regulator 90 is closed so that hydrogen gas does not create positive pressure within main tank 10. Therefore, liquid hydrogen will not be released from main tank 10 into primary feed system 4 through closed valve 18, except as required to adjust fluid pressure within the system. The hydrogen that is already in primary feed system 4 flows through recuperator 20, around turbine 30 along turbine bypass line 38 and into reactor 6. The heated hydrogen bypasses recuperator 20 and enters fuel assemblies 48, where it is further heated by the decaying power in fuel assemblies 48.

Closed-loop valve 96 is closed so that all of the hydrogen bypasses nozzle 8 and flows into turbine 62 of auxiliary feed system 60. Turbine 62 drives compressor 64 and motorgenerator 74 to pump the flow through the system and create electricity for all spaceship systems including power to electric pump 14. Control valve 82 can be varied in this mode to direct a first portion of the hydrogen through recuperator 20 and a second portion of the hydrogen directly into radiator 84. The first portion of hydrogen transfers the heat picked up from cooling reactor 6 to the cooler hydrogen in primary feed line 24 to retain heat within the system. The second portion of hydrogen discharges most of its heat into space.

At higher thermal power levels (i.e. reactor 6 is still close to 1% of full power), the majority of the hydrogen will preferably bypass recuperator 20 to discharge the heat into space. At this point, reactor 6 power levels are still too high and this energy should be radiated out of the system. During operation at lower thermal power levels, however, reactor power is preferably conserved to produce electricity, refrigerate main tank 10 and provide thrust through ACS nozzles. Therefore, the majority or all of the hydrogen will be directed through recuperator 20 to retain the heat within nuclear engine 2.

Another problem caused by shutting down nuclear rocket engines is that the engine may have to be started up again during the mission (start-up). Start-up consists of starting reactor 6 and allowing primary feed system 4 to pump hydrogen from a main tank 10 into reactor 6. This operation requires balancing the cooling needs of the fission reactor 6 with the pressure and flow limitations of turbopumps 12. If the pressure and flow limitations of turbopumps 12 are not met, the pumps 12 could stall during start-up. This causes too little flow into reactor 6 and possible overheating. It also delays start-up which wastes hydrogen propellant. If too much flow is introduced into reactor 6, a reactor power spike can result because the fission efficiency in reactor 6 (a key factor determining the power generated by the reactor) improves with an increased amount of hydrogen.

These problems are solved by starting from the zero thrust mode, transitioning to the low thrust mode as reactor 6 power increases and then shifting into the high thrust mode to reach full reactor power (thrust). To cold start rocket engine 2, hydrogen is circulated through primary feed system 4, reactor 6 and auxiliary feed system 60 in the same manner as in the zero thrust mode. Motor generator 74 spins compressor 64 to circulate hydrogen. If there is an electric power failure, vent 104 is opened to cause flow through turbine 62 to bleed into space. Instead of radiating all of the heat into space or transferring all of the heat through recuperator 20, however, heat from the recuperator 20 is used to drive turbine 62 at a higher speed. Turbine 62 then drives compressor 64 which, in turn, pressurizes the hydrogen. When the circulating hydrogen reaches the appropriate pressure and temperature conditions, reactor 6 is started. Pump 14 starts, valve 96 is opened and the system is reconfigured into the low thrust mode.

With this configuration, the operator can start the engine to achieve a desired amount of thrust almost immediately because the low thrust mode chills the main pump 12 with pump 14 effluent and primary feed system 4 is pre-heated and pre-pressurized to the appropriate temperature and pressure by circulating hydrogen through auxiliary feed system 60, as discussed above. At the moment the desired high thrust is needed, the operator opens valves 80 and 90 to provide positive pressure in main tank 10 and primary feed system 4 will immediately start at the appropriate temperature and pressure conditions for the desired thrust. This scheme avoids the previous problems of cold starting the engine with cold, low pressure hydrogen from main tank 10.

The above is a detailed description of a particular embodiment of the invention. It is recognized that departures from the disclosed embodiment may be made within the scope of the invention and that obvious modifications will occur to a person skilled in the art. The full scope of the invention is set out in the claims that follow and their equivalents. Accordingly, the claims and specification should not be construed to unduly narrow the full scope of protection to which the invention is entitled.

What is claimed is:

1. A nuclear thermal rocket engine comprising:

a rocket propellant source;

a nuclear reactor including an inlet for receiving propellant from said propellant source, fuel assemblies for heating said propellant, an outlet coupled to said fuel assemblies for discharging said heated propellant therefrom and a recycling port disposed between said fuel assemblies and said outlet;

a primary feed system including a line coupling said rocket propellant source to said nuclear reactor inlet and a pump coupled to said line for pumping said propellant through said line; and an auxiliary feed system including a bypass line having an inlet receiving heated propellant from said recycling port, a first outlet for returning a first portion of said heated propellant to said rocket propellant source and a second outlet for returning a second portion of said heated propellant to a fluid line between said nuclear reactor inlet and said fuel assemblies, said auxiliary feed system further including means for withdrawing heat from propellant flowing through said bypass line.

2. The rocket engine of claim 1 further including a recuperator coupled to said bypass line and to said primary feed line between said pump and said nuclear reactor inlet, the recuperator being adapted to transfer heat from propellant flowing through said bypass line to propellant flowing through said primary feed line.

3. The rocket engine of claim 1 further including an electric pump coupled to said primary feed line between said pump and said propellant source for receiving said propellant from said propellant source and pumping said propellant to said nuclear reactor inlet, said auxiliary feed system providing power to said electric pump.

4. The rocket engine of claim 2 wherein said auxiliary feed system includes a turbine and a compressor coupled to said bypass line for pumping said second portion of said heated propellant from said recycling port to said nuclear reactor, said first portion of said heated propellant being allowed to flow back into said propellant source.

5. The rocket engine of claim 4 further including a valve coupled to said bypass line between a discharge side of said turbine and said recuperator, said valve being adapted to eject a portion of said propellant into space to decrease fluid pressure at said discharge side of said turbine.

6. A nuclear thermal rocket engine comprising:

a rocket propellant source;

a nuclear reactor including an inlet for receiving propellant from said propellant source, fuel assemblies for heating said propellant, an outlet coupled to said fuel assemblies for discharging said heated propellant and a recycling port disposed between said fuel assemblies and said outlet;

a primary feed system including a line coupling said rocket propellant source to said nuclear reactor inlet and a pump coupled to said line for pumping said propellant through said line; and an auxiliary feed system including a bypass line having an inlet for receiving heated propellant from said recycling port and an outlet for directing a substantial portion of said heated propellant to said primary feed line downstream of said propellant source and upstream of said nuclear reactor inlet, said auxiliary feed system further including means for withdrawing heat from propellant flowing through said bypass line.

7. The rocket engine of claim 6 further including a turbine and a compressor coupled to said bypass line for pumping propellant from said recycling port to said primary feed line.

8. The rocket engine of claim 6 further including a recuperator coupled to said primary feed line between said pump and said nuclear reactor inlet and to said bypass line between said turbine and said compressor, the recuperator being adapted to transfer heat from propellant flowing through said bypass line to propellant flowing through said primary feed line.

9. The rocket engine of claim 8 wherein the withdrawing means includes a radiator for withdrawing a substantial portion of the heat from said propellant and discharging said portion of said heat into space.

10. A nuclear thermal rocket engine comprising:

a rocket propellant source;

a nuclear reactor including an inlet for receiving propellant from said propellant source, fuel assemblies for heating said propellant, an outlet coupled to said fuel assemblies for discharging said heated propellant and a recycling port disposed between said fuel assemblies and said outlet;

a primary feed system including a line coupling said rocket propellant source to said nuclear reactor inlet and a pump coupled to said line for pumping said propellant through said line;

an auxiliary feed system including a bypass line having an inlet for receiving heated propellant from said recycling port and an outlet for directing a portion of said heated propellant to said primary feed line, said auxiliary feed system further including means for withdrawing heat from propellant flowing through said bypass line; and a controllable valve coupled to said bypass line between said turbine and said recuperator, the valve being adapted to selectively control propellant flow such that a first portion of said propellant flows through said recuperator to said radiator and a second portion of said propellant flow bypasses said recuperator and flows directly to said radiator.

* * * * *